(12) United States Patent
Finkenzeller et al.

(10) Patent No.: US 8,766,776 B2
(45) Date of Patent: Jul. 1, 2014

(54) TRANSPONDER UNIT

(75) Inventors: Klaus Finkenzeller, Unterfohring (DE); Rainer Schmidtke, Unterhaching (DE)

(73) Assignee: Giesecke & Devrient GmbH, Munich (DE)

( * ) Notice: Subject to any disclaimer, the term of this patent is extended or adjusted under 35 U.S.C. 154(b) by 275 days.

(21) Appl. No.: 13/125,706

(22) PCT Filed: Oct. 23, 2009

(86) PCT No.: PCT/EP2009/007613
§ 371 (c)(1),
(2), (4) Date: Apr. 22, 2011

(87) PCT Pub. No.: WO2010/046128
PCT Pub. Date: Apr. 29, 2010

(65) Prior Publication Data
US 2011/0260837 A1   Oct. 27, 2011

(30) Foreign Application Priority Data
Oct. 24, 2008   (DE) .......................... 10 2008 053 097

(51) Int. Cl.
*H04Q 5/22* (2006.01)
(52) U.S. Cl.
USPC ....................................................... 340/10.1
(58) Field of Classification Search
USPC ....................................................... 340/10.1
See application file for complete search history.

(56) References Cited

U.S. PATENT DOCUMENTS

| 4,590,440 | A | * | 5/1986 | Haque et al. ................. 331/17 |
| 5,566,154 | A | * | 10/1996 | Suzuki ...................... 369/59.26 |
| 5,828,954 | A | * | 10/1998 | Wang ........................... 455/260 |
| 6,294,980 | B1 | * | 9/2001 | Berger et al. ................ 340/10.1 |
| 6,879,809 | B1 | | 4/2005 | Vega et al. |
| 2007/0159303 | A1 | | 7/2007 | Tyulpanov |
| 2008/0068135 | A1 | * | 3/2008 | Kung et al. .................. 340/10.4 |
| 2009/0040022 | A1 | * | 2/2009 | Finkenzeller ................ 340/10.1 |

FOREIGN PATENT DOCUMENTS

| DE | 102004031092 | 1/2006 |
| DE | 102005061660 | 6/2007 |
| EP | 1801738 | 12/2006 |

OTHER PUBLICATIONS

International Search Report in PCT/EP2009/007613, May 28, 2010.

* cited by examiner

*Primary Examiner* — Jennifer Mehmood
*Assistant Examiner* — Omar Casillashernande
(74) *Attorney, Agent, or Firm* — Bacon & Thomas, PLLC

(57) ABSTRACT

A transponder unit for transferring data to a reading device by modulation of an electromagnetic field includes a device for varying the data block size of the data by restricting the same or by modifying a clock signal, in dependence on a frequency difference between a clock frequency of a clock signal transferred from the reading device to the transponder unit, and a frequency generator frequency of a frequency generator of the transponder unit.

5 Claims, 4 Drawing Sheets

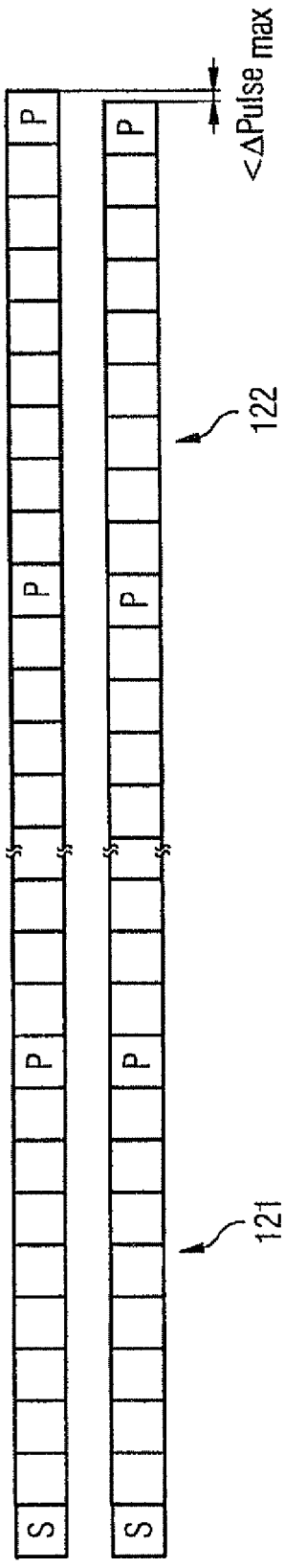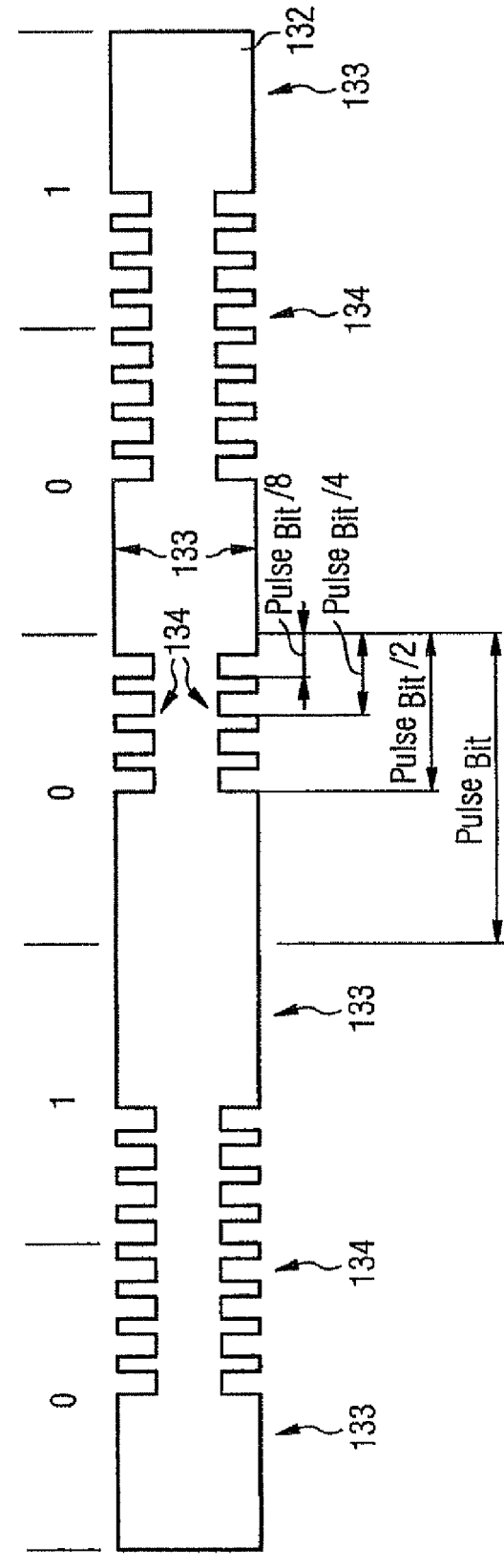

TRANSPONDER UNIT

BACKGROUND OF THE INVENTION

1. Field of the Invention

The present invention relates to a transponder unit for transferring data to a reading device by means of an electromagnetic field, to a system comprising the reading device and the transponder unit, and to a method for transferring data from the transponder unit to the reading device.

2. Related Art

Transponder units are used for wireless data communication in particular in the near zone. Known methods for data transfer in the near zone are for example Bluetooth, WLAN, DECT, RFID or NFC.

RFID (Radio Frequency Identification) is a data transfer method by means of electromagnetic fields in a frequency range of e.g. 13.56 MHz or 868 MHz. The RFID transfer method offers the possibility of taking from the field of the reading device the energy required for operation of the transponder by means of the antenna employed at the same time for data transfer. Hence, the RFID transfer method is particularly suitable for chip cards involving contactless data transfer.

NFC (Near Field. Communication) is a data transfer method by means of electromagnetic fields in the frequency range of 13.56 MHz. The methods used for data transfer in NFC are very similar to those of contactless RFID chip cards. NFC devices can both communicate with RFID chip cards and simulate RFID chip cards.

In RFID and NFC the data transfer from the transponder unit (or the NFC device acting as a transponder) to the reading device (or the NFC device acting as a reading device) can be effected in particular through load modulation or by means of a method for modulating the backscatter cross section (electromagnetic backscatter coupling).

Upon data transfer from the transponder unit to the reading device through load modulation (inductive coupling), the alternating current which is induced in the transponder coil by an electromagnetic field generated by the reading device is influenced by switching a load resistor on and off. According to the principle of transformer coupling, this effects a change of current and voltage on a primary coil of the reading device with which coil the electromagnetic field is generated. This makes it possible to transfer data.

Upon data transfer from the transponder unit to the reading device through modulation of backscatter cross section, the backscatter cross section, which gives information about how strongly an object reflects electromagnetic waves, is modulated. For example, antennas have an especially strong backscatter cross section in case of resonance.

From the patent application DE 10 2004 031 092 A1 there is known a transponder unit which can communicate with a commercially usual RFID reading device conceived for data reception by means of load modulation or modulation of backscatter cross section, or with an NFC device acting as a reading device. Said transponder unit possesses not only a separate energy supply, but is also configured as an actively transmitting transponder unit. The actively transmitting transponder unit sends data to a reading device by means of a self-generated field, in such a way that the generated signal differs for the reading device only slightly from a modulation as would be generated by a conventional transponder unit or an NFC transmitter. Without a load modulation or backscatter modulation of the reading device field generated by the reading device, the transponder unit thus itself generates a field which simulates to the reading device a modulation of the reading device field by a transponder unit. By means of this method the range can be increased. An application of this method in (small) memory cards, such as a multimedia card or a μSD card, in particular in combination with a secure element, is described in the patent application DE 10 2005 061 660 A1.

In conventional RFID/NFC systems, the electromagnetic field generated by the reading device can be continually received via an antenna of the transponder. The frequency of the RF alternating voltage induced in the transponder antenna can thus be continually evaluated and is thus available to the transponder as a clock frequency for clocking the data transfer between transponder and reading device. The clock frequency then corresponds exactly to the transmitting frequency of the reading device and is coupled thereto with phase synchronization. It is of no matter here whether the transponder unit is receiving data from the reading device, is in a non-communication mode (e.g. processing a command, waiting for a command) or is sending data to the reading device e.g. by load modulation or by means of modified backscatter cross section.

In contrast, in the method described by the above-mentioned patent applications DE 10 2004 031 092 A1 and DE 10 2005 061 660 A1, in which method the transponder unit sends data to the reading device in an active transmit mode, the clock signal of the reading device is superimposed, during the transmit mode of the transponder unit, by the signal emitted by the transponder unit and can no longer be received by the transponder unit. Hence, during the transfer of data such an actively transmitting transponder unit requires its own frequency generator (e.g. a quartz oscillator).

There can thereby occur a frequency difference between the clock frequency of the reading device and the frequency generator frequency of the frequency generator of the active transponder. This subsequently leads to a slight deviation between the bitrate expected by the reading device and the actual bitrate of the data sent by the transponder unit, and can lead to errors in data transfer when data bits are sent at a different time point from that expected by the reading device.

To avoid this problem, DE 10 2004 031 092 A1 proposes synchronizing the frequency generator with the clock signal emitted by the reading device in phase lock by means of a phase-locked loop (PLL) circuit. However, such a circuit increases the production cost of the transponder unit.

Hence, it is the object of the present invention to provide an actively transmitting transponder unit which guarantees a reliable data transfer with simple means.

This object is achieved by the features of the independent claims. In claims dependent thereon there are stated advantageous embodiments and developments of the invention.

BRIEF SUMMARY OF THE INVENTION

Accordingly, the transponder unit for transferring data to a reading device comprises a receiver for receiving a clock signal which is emitted by the reading device at a clock frequency, a frequency generator for generating a frequency generator frequency which is employed for clocking the transfer of the data, and a frequency comparator which is adapted to determine the frequency difference between the clock frequency and the frequency generator frequency. Furthermore, the transponder unit comprises, according to a first variant, a device for restricting the data block size of the data to be sent to the reading device to a maximum data block size dependent on the frequency difference.

This solution makes use of the fact that, for the first bits of a data block, a deviation of the bitrate expected by the reading device from the actual bitrate of the data sent by the transponder unit leads only to a small deviation of the expected transmission time point of a bit from the actual transmission time point. The error of a slightly differing bit time adds up over the data block, however, and results in the time difference between the expected and the actual transmission time points clearly increasing, in particular for the last bits of the data block, with growing size of the data block. To prevent this time difference from becoming too great, the data block size is restricted. When the data block size is so restricted—in dependence on the frequency difference—that even the last bit of a data block is not transferred at a time point when the reading device already expects the next or the preceding bit of the data block, there cannot occur a reading error in the reading device. By means of a restriction of data block size on the basis of the frequency difference it is thus possible to avoid or limit errors in data transfer.

Preferably, the data block size is restricted to the following maximum data block size dependent on the frequency difference:

$$\text{Byte}_{MaxBlock} \leq [\Delta \text{Pulse}_{max} \cdot f_c]/[|\Delta f_{PICC \leftrightarrow PCD}| \cdot \text{Bit}_{Byte} \cdot \text{Pulse}_{Bit}],$$

where $\text{Byte}_{MaxBlock}$ is the maximum data block size in bytes per data block, $f_c$ is the frequency generator frequency, $\Delta f_{PICC \leftrightarrow PCD}$ is the frequency difference between the clock frequency and the frequency generator frequency, $\text{Bit}_{Byte}$ is the number of bits per byte (e.g. 8 data bits+1 parity bit), $\text{Pulse}_{Bit}$ is the number of pulses per bit of a subcarrier signal (ISO 14443: 848 kHz), and $\Delta \text{Pulse}_{max}$ is a constant which is smaller than $\text{Pulse}_{Bit}/2$ or $\text{Pulse}_{Bit}/4$ or $\text{Pulse}_{Bit}/8$.

This condition describes a restriction of the data block size to a maximum number of bytes $\text{Byte}_{MaxBlock}$ which depends on the frequency difference $\Delta f_{PICC \leftrightarrow PCD}$ and on the constant $\Delta \text{Pulse}_{max}$. The constant $\Delta \text{Pulse}_{max}$ states the maximum permissible time difference between the expected and the actual transmission time points of the last bit of the data block, measured in units of clock pulses. Said time difference must generally be smaller than $\text{Pulse}_{Bit}/2$ (half the duration of transmission of a bit), because a time difference of exactly $\text{Pulse}_{Bit}/2$ (or more) would mean that the last bit of the data block is being sent half (or more than half) outside the time period in which it is expected by the reading device. Error-free data transfer is no longer possible as of this limiting case at the latest.

Frequently, a data bit is also encoded as a sequence of two temporally consecutive time segments in which the transmit signal is modulated differently. For example, it is possible to represent the value 1 of a data bit by the signal being modulated at a subcarrier frequency, which is typically a fraction of the frequency generator frequency, during the first half of the time period in which the data bit is sent, and the signal not being modulated in the second half of the time period in which the data bit is sent. The value 0 of a data bit is then represented by the signal not being modulated during the first half of the time period in which the data bit is sent, and the signal being modulated at the subcarrier frequency in the second half of the time period in which the data bit is sent. With this kind of data transfer, at least a restriction to $\Delta \text{Pulse}_{max} < \text{Pulse}_{Bit}/4$ is necessary. For with $\Delta \text{Pulse}_{max} = \text{Pulse}_{Bit}/4$ a time span in which the signal is modulated or not modulated, and which again corresponds to half the time period in which the data bit is sent, falls only half within the time period in which the data bit is expected by the reading device.

In particular, it has turned out to be especially favorable with the previously explained data encoding when the maximum offset of the clock pulses at the end of the data block is restricted to the periodic time of the subcarrier frequency employed for modulation. If the data are transferred by the common standard ISO/IEC 14443, this corresponds precisely to $\Delta \text{Pulse}_{max} \leq \text{Pulse}_{Bit}/8$.

In accordance with this transponder unit, which comprises a device for restricting the data block size of the data to a maximum data block size dependent on the frequency difference, there is furthermore proposed a method for transferring data from a transponder unit to a reading device. In said method, the frequency difference between the clock frequency of the received clock signal and the generated frequency generator frequency is determined, and in dependence thereon, for the transfer of data to the reading device, the data block size of the data to be transferred is restricted to maximum data block size.

In a second variant, as already in the first variant, the transponder unit for transferring data to the reading device comprises a receiver for receiving a clock signal which is emitted by the reading device at a clock frequency, a frequency generator for generating a frequency generator signal at a frequency generator frequency, said signal consisting of pulses clocked at the frequency generator frequency and being employed for clocking the transfer of the data, and a frequency comparator which is adapted to determine the frequency difference between the clock frequency and the frequency generator frequency. However, in this second variant, the transponder unit furthermore comprises a device for modifying the frequency generator signal by generating additional pulses or removing pulses in dependence on the frequency difference.

Upon use of the modified frequency generator signal for clocking the data transfer, the transfer time of a data bit and thus the bitrate of the data sent by the transponder unit can be influenced in targeted fashion by adding or removing pulses. Accordingly, the bitrate of the sent data can be adjusted to the bitrate expected by the reading device by adding or removing pulses in dependence on the ascertained frequency difference. This again makes it possible to reduce or avoid transfer errors that would arise when data bits are sent at a different time from that expected by the reading device. Thus there is also effected an intervention on the level of the data structure in this second variant, as already in the first variant. While in the first variant the data packet size is restricted in targeted fashion, in the second variant the length of the data packets is influenced by inserting/removing pulses. Both variants have the result that the reading device notices nothing of the existing frequency difference.

The device for modifying the frequency generator signal according to the second variant is preferably adapted to generate additional pulses in the case of negative frequency differences, where the frequency generator frequency is smaller than the clock frequency, and to remove pulses from the frequency generator signal in the case of positive frequency differences, where the frequency generator frequency is greater than the clock frequency. Thus it is possible to correct the number of pulses of the modified frequency generator signal in the direction of the number of pulses of the clock signal over a specified time period, so that the average bitrate of the sent data is closer to the bitrate expected by the reading device.

Even more preferably, the device for modifying the frequency generator signal is so adapted that it brings the total number of pulses of the modified frequency generator signal precisely to the number of pulses of the clock signal over a specified time period. Thus, upon use of the modified frequency generator signal for clocking the data transfer, the bitrate of the sent data averaged over the specified time period is adjusted precisely to the bitrate expected by the reading device.

In accordance with said transponder unit comprising a device for modifying the frequency generator signal by generating additional pulses or removing pulses in dependence on the frequency difference, there is proposed a method for transferring data from a transponder unit to a reading device. In said method, the frequency difference between the clock frequency of the received clock signal and the frequency generator frequency of the generated frequency generator signal is again determined and in dependence thereon the frequency generator signal is modified by generating additional pulses or removing pulses, whereby the transfer of the data is effected employing the modified frequency generator signal.

Moreover, the transponder unit preferably transmits the data actively to the reading device in such a fashion that the signal received by the reading device is evaluable as a modulation of an electromagnetic field generated by the reading device (e.g. load modulation or modulation of a backscatter cross section).

DESCRIPTION OF THE DRAWINGS

The invention will hereinafter be explained by way of example with reference to the attached drawings. There are shown:

FIG. 1 a schematic view of a comparison of the transmission time points of the bits of a data block sent by a transponder unit, with the transmission time points expected by a reading device, FIG. 2 a schematic view of the radiofrequency signal of a conventional load modulation from which values for $\Delta Pulse_{max}$ can be derived, FIG. 3 a schematic view of a transponder unit according to a first variant having a device for restricting the data block size of the data to be transferred, FIG. 4 a schematic view of a frequency generator signal which has been modified in comparison to a clock signal by insertion of an additional pulse, and FIG. 5 a schematic view of a transponder unit according to a second variant having a device for modifying a frequency generator signal by generating additional pulses or removing pulses.

DETAILED DESCRIPTION OF PREFERRED EMBODIMENTS OF THE INVENTION

Figure 3:
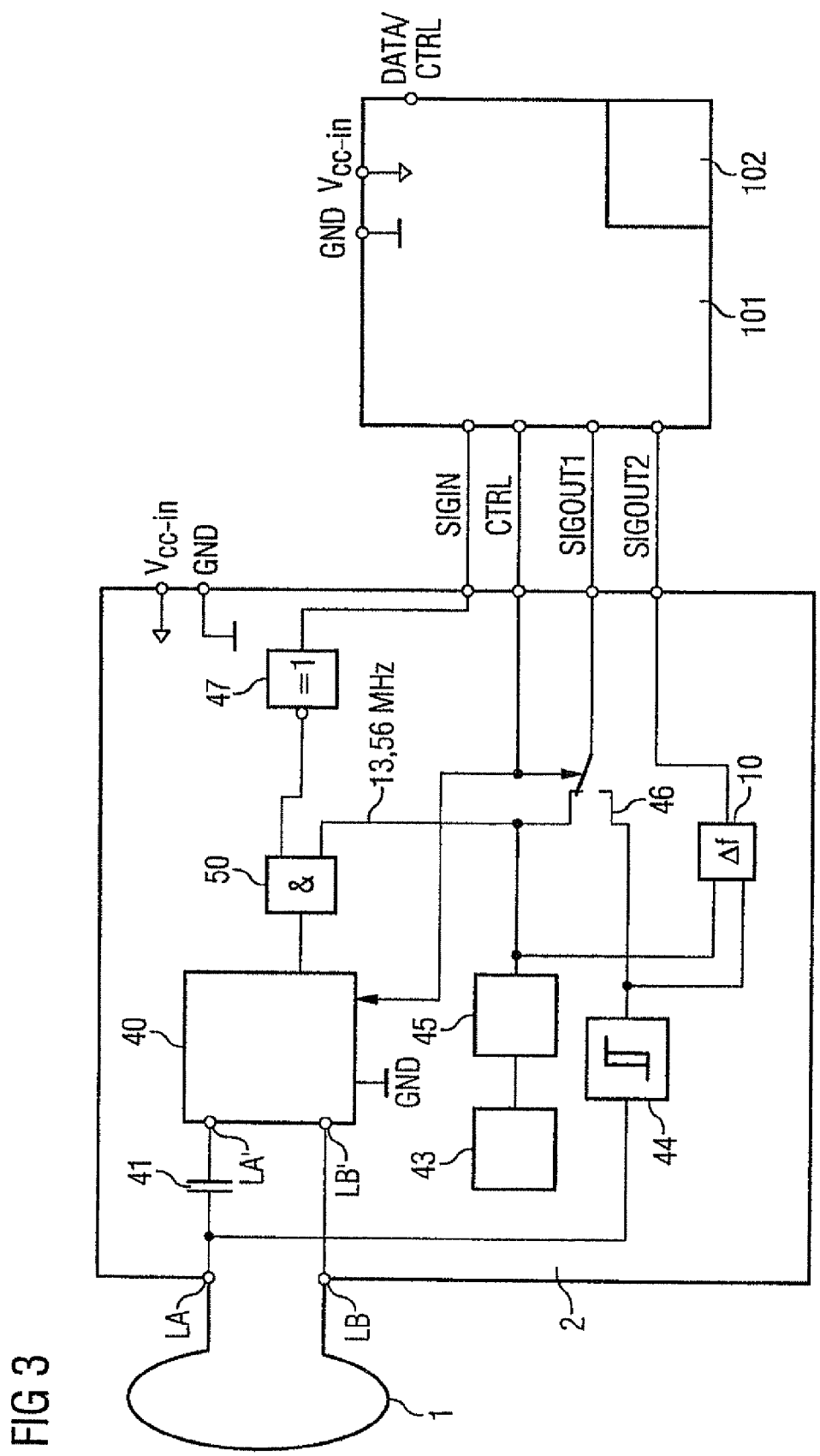

In FIG. 1, the transmission time points 121, 122 of the bits of a data block sent by a transponder unit are compared schematically with the transmission time points 123, 124 of the bits of the data block as expected by the reading device. The data block consists of a start bit S followed by several data bytes which respectively comprise 8 data bits and one parity bit P. In the starting area of the data block the transmission time points 123 of the bits as expected by the reading device readily match the actual transmission time points 121. This is due to the fact that the reading device must either be adapted to recognize the beginning of a data block or to initiate it itself. However, the error of a slightly differing bit time adds up over the data block. Hence, there results after a few data bytes a clear difference between the expected transmission time points 124 of the bits and the actual transmission time points 122 of the bits.

To prevent said time difference from becoming too great, the data block size is restricted according to, a first implementation variant. In this connection it is generally necessary to restrict the data block size in such a way that the maximum permissible time difference $\Delta Pulse_{max}$ between the expected and the actual transmission time points of the last bit of the data block is smaller than half $Pulse_{Bit}/2$ of the duration of transmission $Pulse_{Bit}$ of a bit, because otherwise the last bit of the data block is sent half or more than half outside the time period in which this is expected by the reading device, and thus can no longer be correctly assigned.

In FIG. 2 there is schematically depicted a data signal 132 wherein data bits are encoded as a sequence of two temporally consecutive time segments in which the transmit signal is modulated differently. The value 1 of a data bit is represented by a signal 134 modulated at a subcarrier frequency in the first half of the transmission time period and signal 133 unmodulated in the second half of the transmission time period. The value 0 of a data bit is accordingly represented by a signal 133 unmodulated in the first half of the transmission time period and signal 134 modulated at the subcarrier frequency in the second half of the transmission time period. With this kind of data transfer, at least a restriction to $\Delta Pulse_{max} < Pulse_{Bit}/4$ is necessary, because with $\Delta Pulse_{max} = Pulse_{Bit}/4$ a time span in which the signal is modulated or not modulated, and which again corresponds to half of the time period in which the data bit is sent, falls only half within the time period in which the data bit is expected by the reading device.

Moreover, it has turned out to be especially favorable with this encoding of the data signal when the maximum offset of the clock pulses at the end of the data block is restricted to the periodic time of the subcarrier frequency employed for modulation. If the data are transferred by the common standard ISO/IEC 14443, this corresponds precisely to $\Delta Pulse_{max} \leq Pulse_{Bit}/8$.

From the equation stated at the outset there results, at a frequency generator frequency $f_c$ of 13.56 MHz, a byte length $Bit_{Byte}=9$ (8 data bits and one parity bit) and a maximum permissible time offset $\Delta Pulse_{max} = Pulse_{Bit}/8$, a maximum data block size of $Byte_{MaxBlock} \leq 256$ bytes when the frequency difference $\Delta f_{PICC \leftrightarrow PCD}$ between the clock frequency and the frequency generator frequency does not exceed 735 Hz. Accordingly, there results a maximum data block size of $Byte_{MaxBlock} \leq 128$ bytes for twice the frequency difference, 1470 Hz, and a maximum data block size of $Byte_{MaxBlock} \leq 64$ bytes for four times the frequency difference, 2940 Hz. Since for example quartzes can have a frequency tolerance of ±1 kHz, which can yield a frequency difference $\Delta f_{PICC \leftrightarrow PCD}$ of up to 2 kHz upon use of a first quartz for generating the clock frequency and a further quartz for generating the frequency generator frequency, these numbers show that there is indeed a need with realistic transponder units to restrict the maximum data block size, which can amount to up to 256 bytes according to ISO/IEC 14443, to up to 64 bytes. A general limitation of the data block size to 64 bytes would be possible, but would lead to speed losses upon data transfer.

In FIG. 3 there is schematically depicted a transponder unit which comprises a radiofrequency module 2 and a control chip 101.

The control chip 101 is connected to the signal input SIGIN, the two signal outputs SIGOUT1 and SIGOUT2 as well as the control signal input CTRL of the radiofrequency module. Moreover, the control chip possesses an input DATA/CTRL via which it is itself controlled and via which it is supplied data from further electronic components.

In the transmit mode the control chip 101 generates from the supplied data a data signal which is transferred to the radiofrequency module via the signal input SIGIN. Said data signal—in this specific embodiment—is inverted by means of signal inverter 47, modulated with the frequency generator signal of the frequency generator 43, 45 by means of the AND gate 50, amplified by the amplifier 40 and sent via the antenna 1.

The frequency generator 43, 45 generates the frequency generator signal required in the transmit mode. The oscillator 43 of the frequency generator is operated at a multiple frequency of the frequency generator frequency. Moreover, the frequency generator is equipped with a divider 45 which can generate the required frequency generator signal from the oscillator signal. An advantage of this arrangement consists in the fact that when the frequency generator signal is not required in the receive mode of the transponder, the divider can be put out of operation to reduce signal disturbances.

The antenna 1 is connected to the radiofrequency module 2 via the antenna terminals LA and LB and is series-connected with a series capacitor 41 to form a series resonant circuit. Said series resonant circuit is connected to the outputs LA' and LB' of the amplifier 40, so that the RF current flowing in case of resonance is limited in the antenna resonant circuit only by the ohmic resistance of the amplifier 40 and of the lines. Thus, a greatest possible transmit power of the radiofrequency module is attained.

Upon the generation of the data signal the control chip requires a signal with the frequency generator frequency for clocking. Said signal is supplied to the control chip via the line SIGOUT1. For this purpose the switch 46 controlled by the control line CTRL must be in the position depicted in the figure during the transmit mode.

In the receive mode the switch 46 is put in the opposite position. In this case there is supplied to the smart card chip via the output SIGOUT a receive signal tapped from the antenna 1 and digitized by means of the signal shaper 44. Via the control line CTRL the amplifier 40 can moreover be switched to a power-saving mode in the receive mode to save energy.

The connections GND serve for grounding, and the connections $V_{cc-in}$ for energy supply.

Furthermore, the radiofrequency module 2, in the implementation variant depicted in FIG. 3, possesses a frequency comparator 10 which compares the clock frequency of a clock signal made available by means of the antenna 1 and the signal shaper 44 with the frequency generator frequency of the frequency generator 43, 45. The output signal of the frequency comparator 10 is supplied via the signal output SIGOUT2 to the control chip 101. The control chip comprises a device 102 for restricting the data block size to a maximum data block size dependent on the frequency difference. By means of a restriction of the data block size on the basis of the frequency difference it is possible to avoid or limit errors in data transfer, while at the same time a very high data transfer rate can be achieved.

Figure 4:
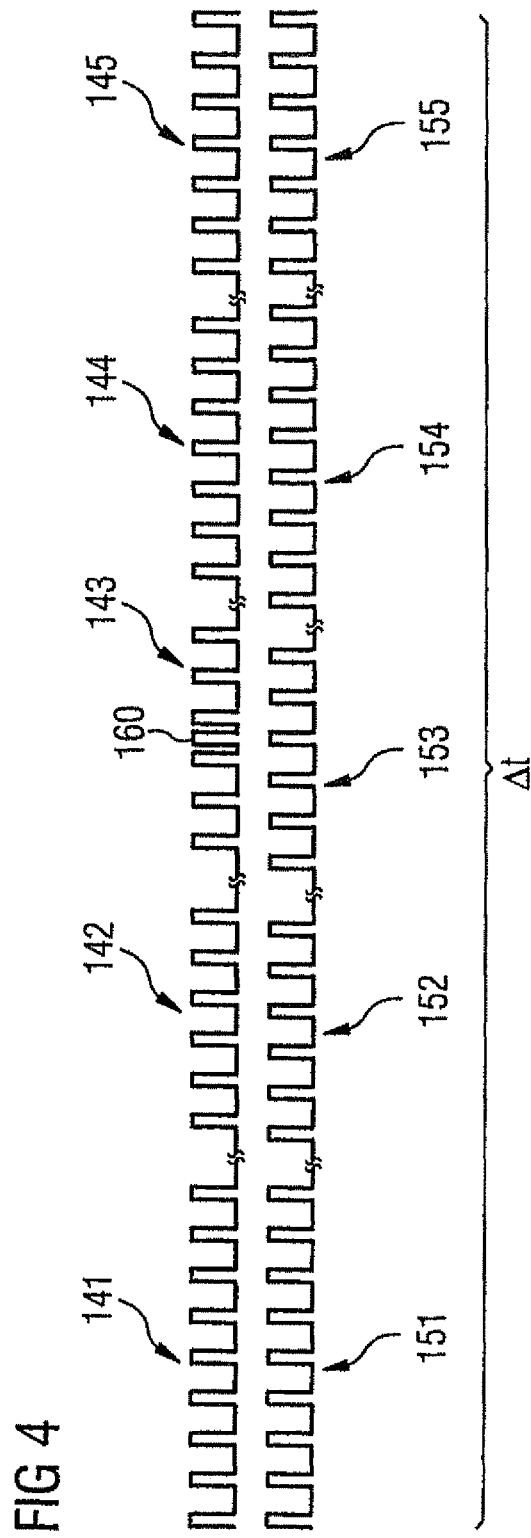

FIG. 4 relates to a second implementation variant. In FIG. 4 there is schematically depicted a frequency generator signal 141, 142, 143, 144, 145 which has been modified by insertion of an additional pulse 160, in comparison to a clock signal 151, 152, 153, 154, 155. The shape of the pulses of said signals is not restricted to the shape depicted by way of example in this figure. Upon the depicted comparison the frequency generator signal 141 is in phase with the clock signal 151 at the beginning of a specified time interval $\Delta t$. In this example the frequency generator frequency is somewhat lower than the clock frequency. Because the resulting difference adds up with time over the periodic time of the signals, the frequency generator signal 142, 143, 144 and the clock signal 152, 153, 154 get ever more clearly out of clock after a few signal periods, so that the signals 145, 155 are finally mutually offset by a whole period. In the depicted example the time interval $\Delta t$ has been chosen exactly such that therein the clock signal possesses precisely P pulses and the unmodified frequency generator signal precisely P−1 pulses. To bring the number of pulses of the frequency generator signal to the total number of pulses of the clock signal over the specified time period $\Delta t$, precisely one additional pulse 160 has hence been inserted into the frequency generator signal. If, by contrast, the clock signal possessed for example precisely P pulses and the unmodified frequency generator signal precisely P+1 pulses in the time interval $\Delta t$, one pulse of the frequency generator signal would instead have to be removed to bring the number of pulses of the frequency generator signal to the total number of pulses of the clock signal over the specified time period $\Delta t$. Upon use of the thus modified frequency generator signal for clocking the data transfer, the bitrate, averaged over the specified time period $\Delta t$, of the data sent by the transponder unit is adjusted precisely to the bitrate expected by the reading device, which is based on the clock signal. This makes it possible to avoid errors in data transfer that arise from data bits being sent at a different time from that expected by the reading device.

Figure 5:
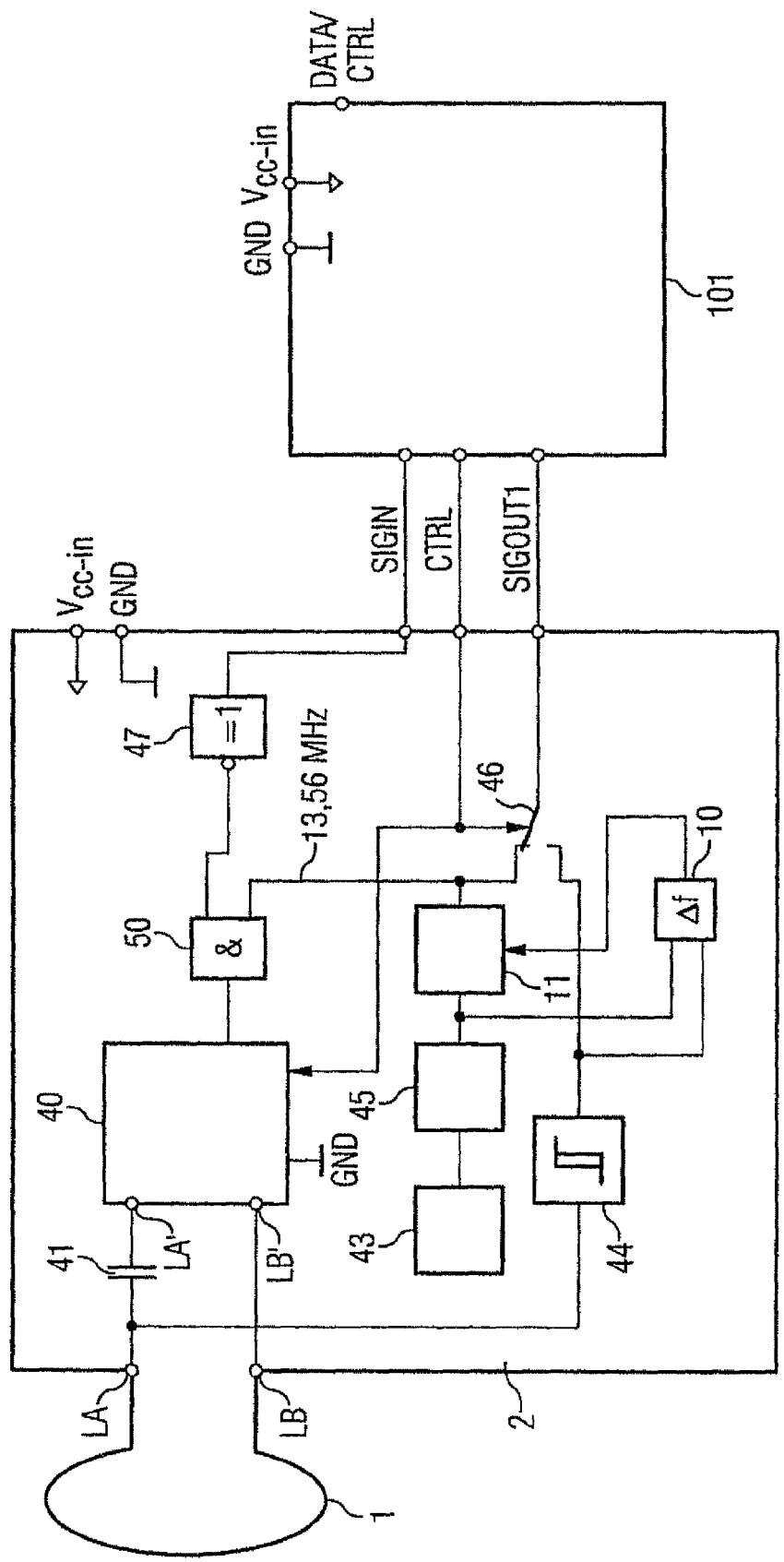

The structure of the transponder unit depicted schematically in FIG. 5 for realizing the second implementation variant follows substantially the structure of the transponder unit depicted in FIG. 3 which realizes the first implementation variant. However, in the transponder unit depicted in FIG. 5 the control chip 101 does not have a device for restricting the data block size to a maximum data block size dependent on the frequency difference, and the output signal of the frequency comparator 10 is not supplied to the control chip 101. Instead, the output signal of the frequency comparator is supplied to a device 11 to modify the frequency generator signal by generating additional pulses or removing pulses in dependence on the frequency difference. Because the modified frequency generator signal is supplied via the output SIGOUT1 during the transmit mode to the control chip 101 for clocking the data transfer, the transfer time of a data bit and thus the bitrate of the data sent by the transponder unit can be influenced by adding or removing pulses. Accordingly, the bitrate of the sent data can be adjusted to the bitrate expected by the reading device by adding or removing pulses in dependence on the frequency difference. It is thus possible to avoid errors in data transfer that would arise if data bits were sent at a different time from that expected by the reading device.

The invention claimed is:

1. A transponder for transferring data to a reading device using an electromagnetic field, comprising:
   a receiver arranged to receive a clock signal emitted by the reading device at a clock frequency;
   a frequency generator configured to generate a frequency generator frequency which is employed for clocking transfer of the data;
   a frequency comparator which is configured to determine a frequency difference between the clock frequency and the frequency generator frequency; and
   a device arranged to restrict the data block size of the data to a data block size dependent on the frequency difference,
   wherein the device restricting the data block size of the data is configured to restrict the data block size to the following data block size $Byte_{MaxBlock}$ dependent on the frequency difference:

$$Byte_{MaxBlock} \leq [\Delta Pulse_{max} \cdot f_c] / [|\Delta f_{PICC \leftrightarrow PCD}| \cdot Bit_{Byte} \cdot Pulse_{Bit}], \quad (1)$$

where $Byte_{MaxBlock}$ is the data block size in bytes per data block, $f_c$ is the frequency generator frequency, $\Delta f_{PICC \leftrightarrow PCD}$ is the frequency difference between the clock frequency and the frequency generator frequency, $Bit_{Byte}$ is the number of bits per byte, $Pulse_{Bit}$ is the number of pulses of the frequency generator signal per bit, and $\Delta Pulse_{max}$ is a constant which is smaller than $Pulse_{Bit}/2$ or $Pulse_{Bit}/4$ or smaller than or equal to $Pulse_{Bit}/8$.

2. The transponder according to claim 1, wherein the transponder is configured to actively transmit data such that the signal generated thereby is evaluable as a modulation of an electromagnetic field generated by the reading device.

3. A system for data transfer, comprising:
at least one transponder for transferring data to a reading device using an electromagnetic field, comprising:
  a receiver arranged to receive a clock signal emitted by the reading device at a clock frequency;
  a frequency generator configured to generate a frequency generator frequency which is employed for clocking transfer of the data;
  a frequency comparator which is configured to determine a frequency difference between the clock frequency and the frequency generator frequency; and
  a device arranged to restrict the data block size of the data to a data block size dependent on the frequency difference,
    wherein the device restricting the data block size of the data is configured to restrict the data block size to the following data block size $Byte_{MaxBlock}$ dependent on the frequency difference:

$$Byte_{MaxBlock} \leq [\Delta Pulse_{max} \cdot f_c]/[|\Delta f_{PICC \leftrightarrow PCD}| \cdot Bit_{Byte} \cdot Pulse_{Bit}], \quad (1)$$

where $Byte_{MaxBlock}$ is the data block size in bytes per data block, $f_c$ is the frequency generator frequency, $\Delta f_{PICC \leftrightarrow PCD}$ is the frequency difference between the clock frequency and the frequency generator frequency, $Bit_{Byte}$ is the number of bits per byte, $Pulse_{Bit}$ is the number of pulses of the frequency generator signal per bit, and $\Delta Pulse_{max}$ is a constant which is smaller than $Pulse_{Bit}/2$ or $Pulse_{Bit}/4$ or smaller than or equal to $Pulse_{Bit}/8$; and
a reading device which is configured to communicate with the transponder.

4. A method for transferring data from a transponder unit to a reading device by using an electromagnetic field, comprising the following steps:
  receiving a clock signal emitted by a reading device, at a clock frequency;
  generating a frequency generator frequency in the transponder unit;
  determining a frequency difference between the clock frequency and the frequency generator frequency;
  transferring data from the transponder unit to the reading device by means of an electromagnetic field employing the frequency generator frequency; and
  restricting the data block size of the data to be transferred to a data block size dependent on the frequency difference,
  wherein the data block size is restricted to the following data block size $Byte_{MaxBlock}$ dependent on the frequency difference:

$$Byte_{MaxBlock} \leq [\Delta Pulse_{max} \cdot f_c]/[|\Delta f_{PICC \leftrightarrow PCD}| \cdot Bit_{Byte} \cdot Pulse_{Bit}],$$

where $Byte_{MaxBlock}$ is the data block size in bytes per data block, $f_c$ is the frequency generator frequency, $\Delta f_{PICC \leftrightarrow PCD}$ is the frequency difference between the clock frequency and the frequency generator frequency, $Bit_{Byte}$ is the number of bits per byte, $Pulse_{Bit}$ is the number of pulses of the frequency generator signal (141, 142, 143, 144, 145) per bit, and $\Delta Pulse_{max}$ is a constant which is smaller than $Pulse_{Bit}/2$ or $Pulse_{Bit}/4$ or smaller than or equal to $Pulse_{Bit}/8$.

5. The method according to claim 4, wherein in the step of transferring the data to the reading device, the transponder unit actively transmits data such that the signal generated thereby is evaluable as a modulation of an electromagnetic field generated by the reading device.

* * * * *